United States Patent
Wu

(10) Patent No.: US 12,233,515 B2
(45) Date of Patent: Feb. 25, 2025

(54) TORQUE SENSING ARRANGEMENT OF POWER TOOL

(71) Applicant: MATATAKITOYO TOOL CO., LTD., Taichung (TW)

(72) Inventor: Yi-Min Wu, Taichung (TW)

(73) Assignee: MATATAKITOYO TOOL CO., LTD., Taichung (TW)

( * ) Notice: Subject to any disclaimer, the term of this patent is extended or adjusted under 35 U.S.C. 154(b) by 369 days.

(21) Appl. No.: 17/965,520

(22) Filed: Oct. 13, 2022

(65) Prior Publication Data

US 2024/0123583 A1  Apr. 18, 2024

(51) Int. Cl.
*B25B 21/00* (2006.01)
*B25B 23/147* (2006.01)
*B25F 5/00* (2006.01)
*H02K 7/14* (2006.01)

(52) U.S. Cl.
CPC ............ *B25B 21/00* (2013.01); *B25B 23/147* (2013.01); *B25F 5/001* (2013.01); *H02K 7/145* (2013.01)

(58) Field of Classification Search
CPC ....... B25B 21/00; B25B 23/147; B25F 5/001; H02K 7/145
See application file for complete search history.

(56) References Cited

FOREIGN PATENT DOCUMENTS

| CN | 217434190 U | 9/2022 |
|----|-------------|--------|
| EP | 2497607 A1 | 9/2012 |

OTHER PUBLICATIONS

Office Action dated Apr. 6, 2023 of the corresponding European search report patent application No. 22201613.1.

*Primary Examiner* — Daniel Jeremy Leeds
(74) *Attorney, Agent, or Firm* — Chun-Ming Shih; HDLS IPR SERVICES

(57) ABSTRACT

A power tool includes a housing (10), a power device (20), a bearing set (30), a torque post (40) and a torque sensor (50). The housing (10) includes a main body (11) and a handle (12) perpendicularly connected to one side of the main body (11). The power device (20) is disposed in the main body (11) and includes a power body (21) and a bushing (22) adapted to sheathe the power body (21). The bearing set (30) is arranged between the bushing (22) and the housing (10). The power body (21) may rotate relative to the housing (10). The torque post (40) is disposed in the handle (12) and abuts against the bushing (22). The torque post (40) is arranged perpendicularly to the power body (21). The torque sensor (50) is disposed on the torque post (40).

10 Claims, 6 Drawing Sheets

TORQUE SENSING ARRANGEMENT OF POWER TOOL

BACKGROUND OF THE DISCLOSURE

Technical Field

This disclosure relates to a power tool, and more particularly relates to a torque sensing arrangement of a power tool.

Description of Related Art

A power tool disposed with a torque sensor in related art may be used to detect the torque. The torque sensor transmits a signal to control the power device to stop when the predetermined torque is reached.

Moreover, the torque sensor of the power tool is usually installed on the transmission mechanism. Therefore, the torque sensor is situated in a rotating state for a long time with the operation of the transmission mechanism. Hence, problems such as broken wires and contact failures may occur to affect the electrical connection and cause damage to the power tool. Additionally, the transmission mechanism connected to the tool head may be vibrated or deformed when the power tool is in operation. Thus, the torque value detected by the torque sensor may be affected, and the accuracy of the torque sensor is reduced.

In view of the above drawbacks, the inventor proposes this disclosure based on his expert knowledge and elaborate researches in order to solve the problems of related art.

SUMMARY OF THE DISCLOSURE

One object of this disclosure is to provide a torque sensing arrangement of the power tool, which the torque post is disposed in the handle and arranged perpendicularly to the power body. Therefore, the torque detection may not be affected by the vibration of the power body, and an accurate torque value may be provided.

Another object of this disclosure is to provide a torque sensing arrangement of the power tool, which the torque post and the torque sensor are disposed in the handle of the housing. Therefore, the torque sensor may not rotate with the power device, and problems such as broken wires and contact failures may be avoided and the convenience of assembly is increased.

In the embodiment of this disclosure, a power tool includes a housing, a power device, a bearing set, a torque post and a torque sensor. The housing includes a main body and a handle perpendicularly connected to one side of the main body. The power device is disposed in the main body. The power device includes a power body and a bushing adapted to sheathe the power body. The bearing set is arranged between the bushing and the housing. The power body is configured to rotate relative to the housing. The torque post is disposed in the handle and abuts against the bushing. The torque post is arranged perpendicularly to the power body. The torque sensor is disposed on the torque post.

In comparison with the related art, the power tool in this disclosure includes the torque post and the torque sensor disposed in the handle of the housing, so that the torque sensor may not rotate with the power device. Therefore, problems such as broken wires and contact failures may be avoided and the convenience of assembly is increased. Moreover, the torque post disposed in the handle is arranged perpendicularly to the power body. Therefore, the torque detection may not be affected by the vibration of the power body, and an accurate torque value is provided to increase the practicality of this disclosure.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
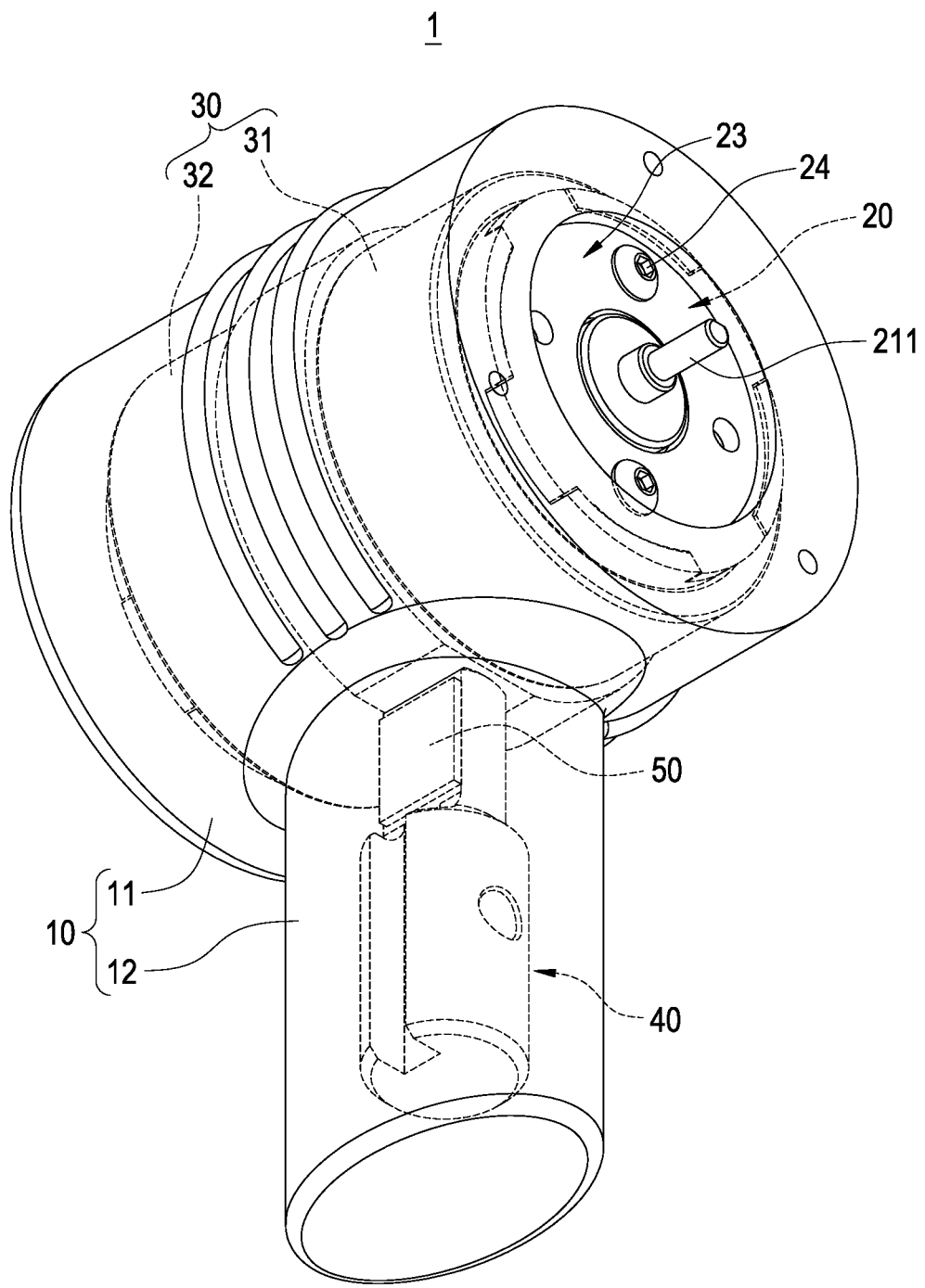
FIG. 1 is a perspective schematic view of the power tool in this disclosure.
Figure 2:
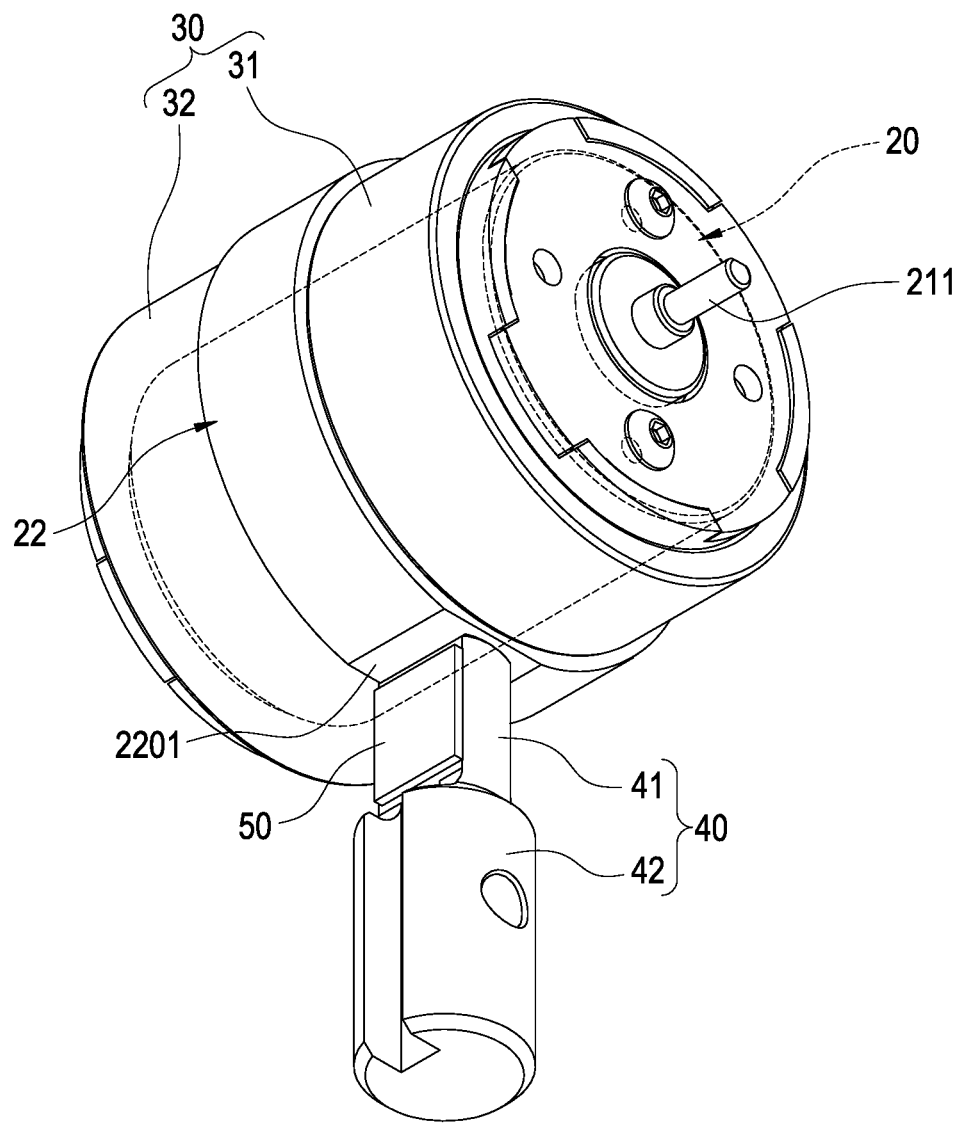
FIG. 2 is a perspective schematic view of the torque sensing arrangement of the power tool in this disclosure.
Figure 3:
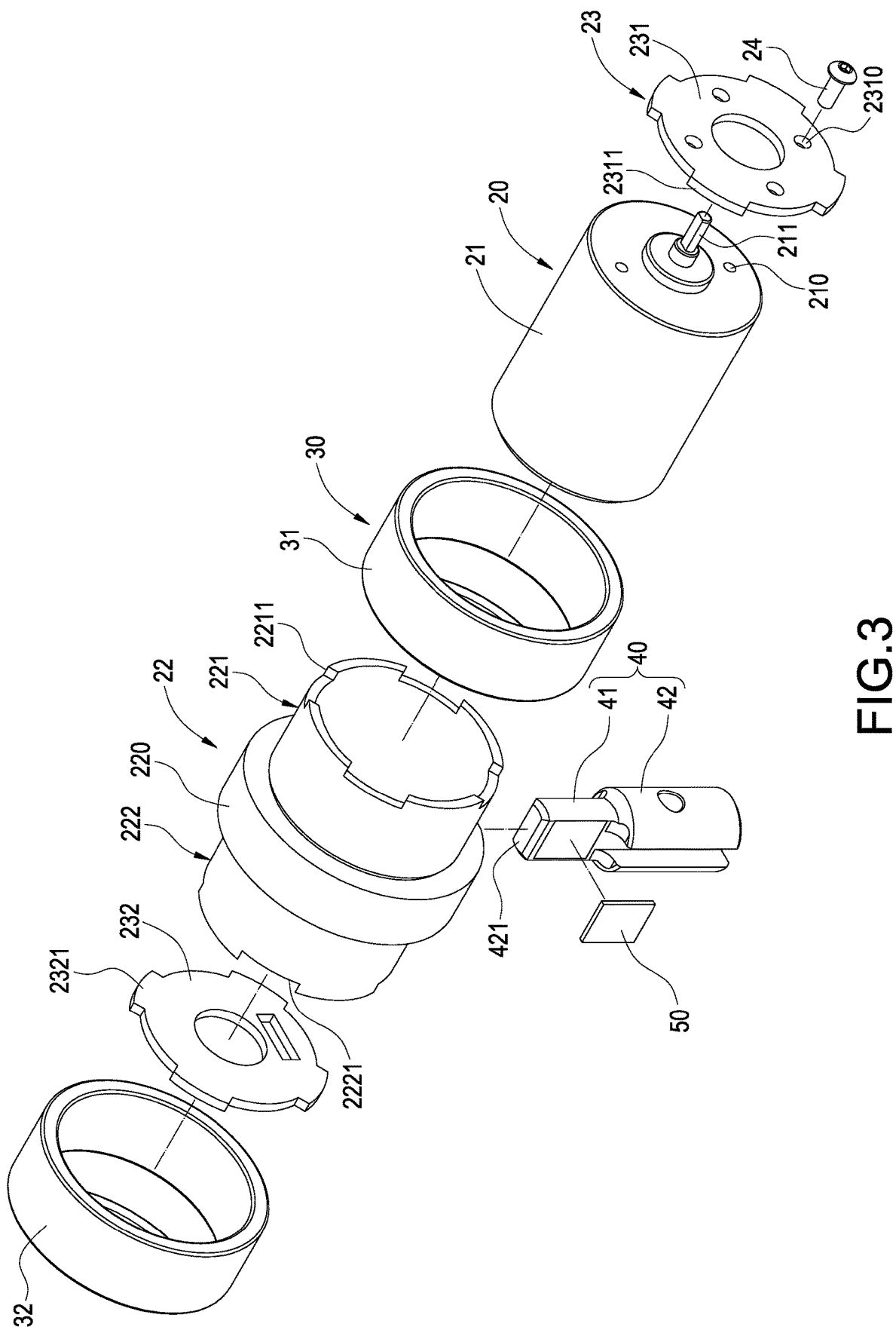
FIG. 3 is a perspective exploded schematic view of the torque sensing arrangement of the power tool in this disclosure.

Please refer to FIG. 1 to FIG. 3, which are a perspective schematic view of the power tool in this disclosure, a perspective schematic view and a perspective exploded schematic view of the torque sensing arrangement of the power tool in this disclosure. This disclosure is a torque sensing arrangement of a power tool. The power tool 1 includes a housing 10, a power device 20, a bearing set 30, a torque post 40 and a torque sensor 50. The power device 20 is installed in the housing 10. The bearing set 30 is disposed between the power device 20 and the housing 10. The torque post 40 is combined with the torque sensor 50 and disposed perpendicularly to the power device 20. Furthermore, the torque value of the power tool 1 is detected through the torque sensor 50, and the operation of the power device 20 is controlled accordingly. The structure of the power tool 1 and the torque sensing arrangement are described in more detail as follows.

The housing 10 includes a main body 11 and a handle 12 perpendicularly connected to one side of the main body 11. In this embodiment, the housing 10 is in a T-shape.

The power device 20 is disposed in the main body 11. The power device 20 includes a power body 21 and a bushing 22 adapted to sheathe the power body 21. The power body 21 is provided with a driving shaft 211.

In this embodiment, the power body 21 is an electric motor, which uses a battery as a power source to drive the driving shaft 211 to rotate. In some embodiments, the power body 21 may be a pneumatic motor, which uses compressed air as a power source to drive the driving shaft 211 to rotate.

The bearing set 30 is arranged between the bushing 22 and the housing 10. Therefore, the power body 21 (with the bushing 22) may rotate relative to the housing 10.

Moreover, an outer annular rib 220 is formed on an outer surface of the bushing 22. The bushing 22 has a bushing front side 221 and a bushing rear side 222 opposite to each other. An end edge of the bushing front side 221 is provided with a plurality of front pawls 2211, and an end edge of the bushing rear side 222 is provided with a plurality of rear pawls 2221.

In one embodiment of this disclosure, the power device 20 further includes a pair of motor fixing pieces 23. The pair of motor fixing pieces 23 includes a front fixing piece 231 and a rear fixing piece 232 disposed on two sides of the bushing 22 opposite to each other. A plurality of front tabs 2311 are arranged spacedly on a periphery of the front fixing piece 231. A plurality of rear tabs 2321 are arranged spacedly on a periphery of the rear fixing piece 232.

Moreover, the power device 20 further includes a plurality of locking members 24. The front fixing piece 231 is provided with a plurality of first locking holes 2310, and the power body 21 is correspondingly provided with a plurality of second locking holes 210. The front fixing plate 231 is fixed on the power body 21 through the locking members 24 passing through the first locking holes 2310 and the second locking holes 210.

Specifically, the front fixing piece 231 is positioned on one end of the bushing front side 221 through the front tabs 2311 being engaged with the front pawls 2211 of the bushing 22. Additionally, the rear fixing piece 232 is positioned on one end of the bushing rear side 222 of the bushing 22 through the rear tabs 2321 being engaged with the rear pawls 2221 of the bushing 22.

Additionally, the bearing set 30 includes a front bearing 31 and a rear bearing 32 arranged on two sides of the outer annular rib 220. Furthermore, the torque post 40 is disposed in the handle 12 to abut against the bushing 22, and the torque post 40 is disposed perpendicularly to the power body 21.

Moreover, the torque sensor 50 may include a strain gauge disposed on the torque post 40. The principle of the torque sensor 50 (strain gauge) is to generate a change of resistance when the torque post 40 is curved (deformed). The change of the resistance may generate a signal, and a corresponding torque value may be obtained after calculation.

Further, the torque post 40 includes a base 41 and a platform 42 connected to the base 41. The torque sensor 50 is disposed on one side of the platform 42. In this embodiment, the platform 42 includes an abutting surface 421. The platform 42 abuts against the outer annular rib 220 of the bushing 22 by the abutting surface 421. Additionally, the outer annular rib 220 is correspondingly provided with an outer annular plane 2201. That is, the abutting surface 421 of the torque post 40 abuts against on the outer annular plane 2201 of the bushing 22.

It is worth of noticing that in this embodiment, the torque post 40 is fixed to the bushing 22 through the outer annular rib 220. The arrangement of the outer annular rib 220 may increase the structural strength of the bushing 22 to prevent the bushing 22 from being deformed under rotation and squeezing (pressure). Therefore, the torque sensor 50 disposed on the torque post 40 may receive specific deformation amount and generate a signal.

Figure 4:
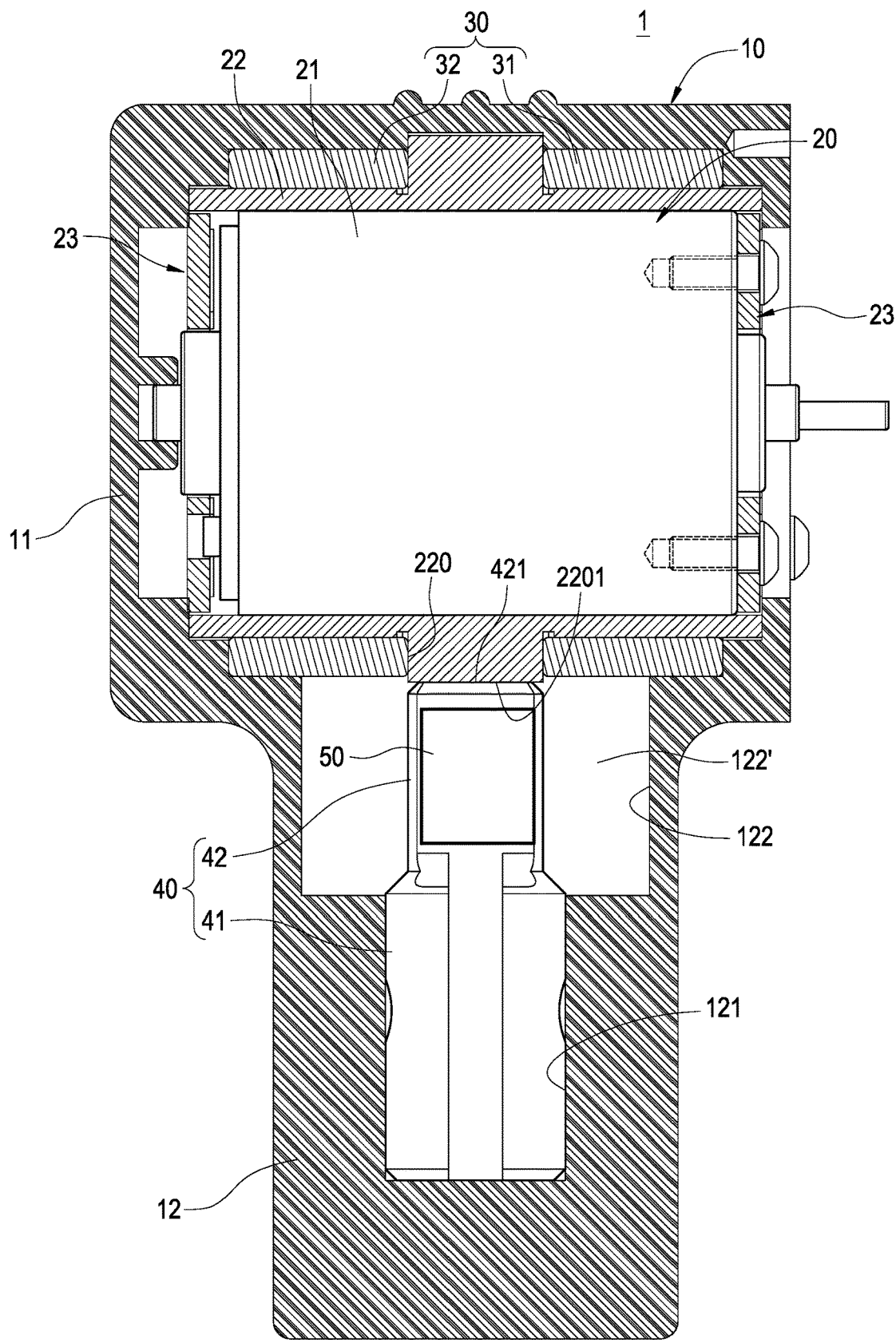
FIG. 4 and FIG. 5 are cross sectional views from two sides of the power tool in this disclosure.
Figure 5:
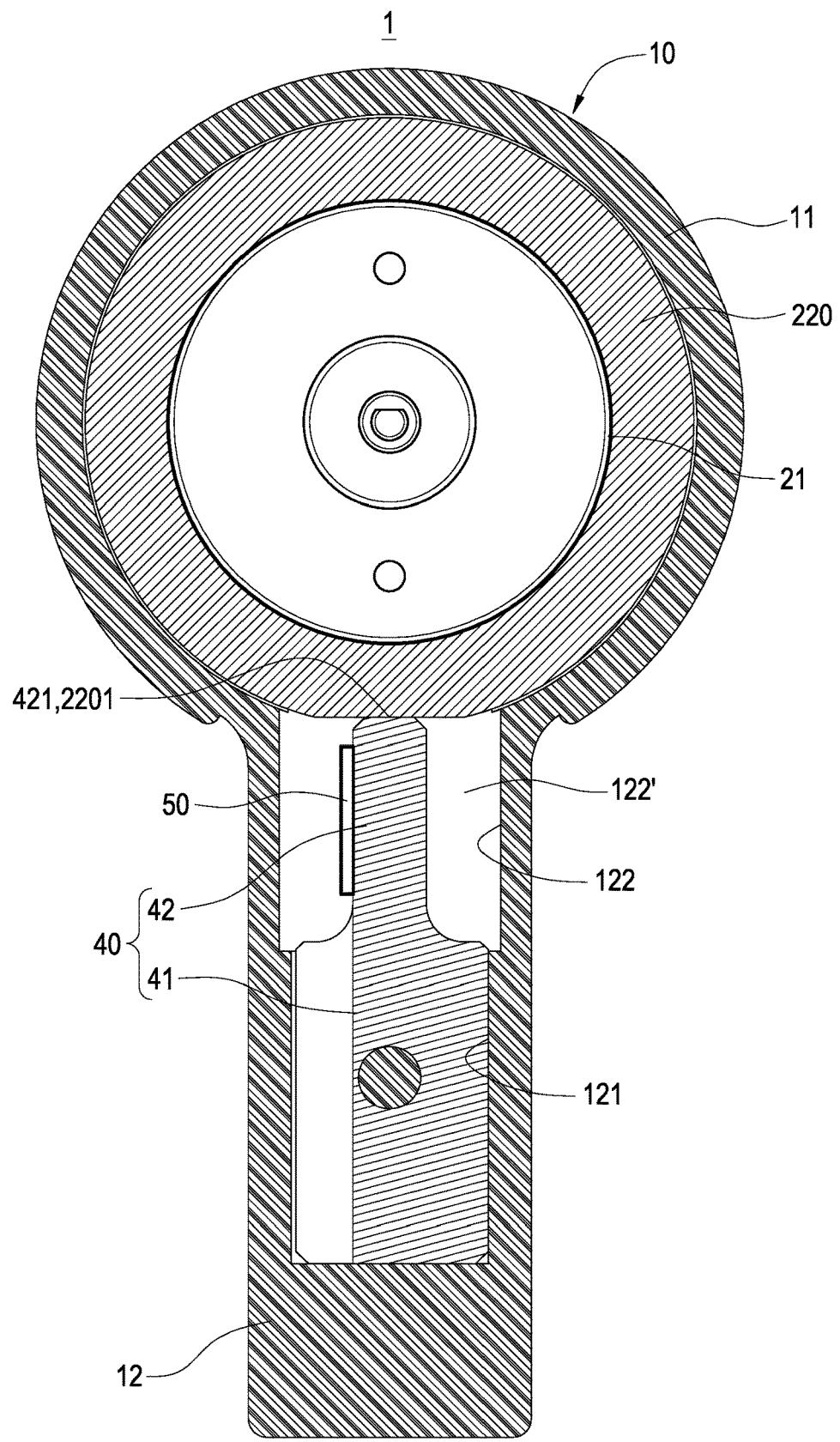

Please further refer to FIG. 4 and FIG. 5, which are cross sectional views from two sides of the power tool in this disclosure. As shown in the figures, the power device 20 of this disclosure is disposed in the main body 11. The bearing set 30 is arranged between the bushing 22 and the housing 10. The pair of motor fixing pieces 23 are disposed on two sides of the power body 21 opposite to each other. Furthermore, the torque post 40 is disposed in the handle 12 and abuts against the bushing 22, and the torque sensor 50 is fixed on the platform 42 of the torque post 40.

It should be noted that the inner of the handle 12 includes a positioning space 121 and an electricity space 122 communicating with each other. Additionally, the base 41 of the torque post 40 is clamped in the positioning space 121. The platform 42 of the torque post 40 is inserted in the electricity space 122 with an installation gap 122' being defined.

Figure 6:
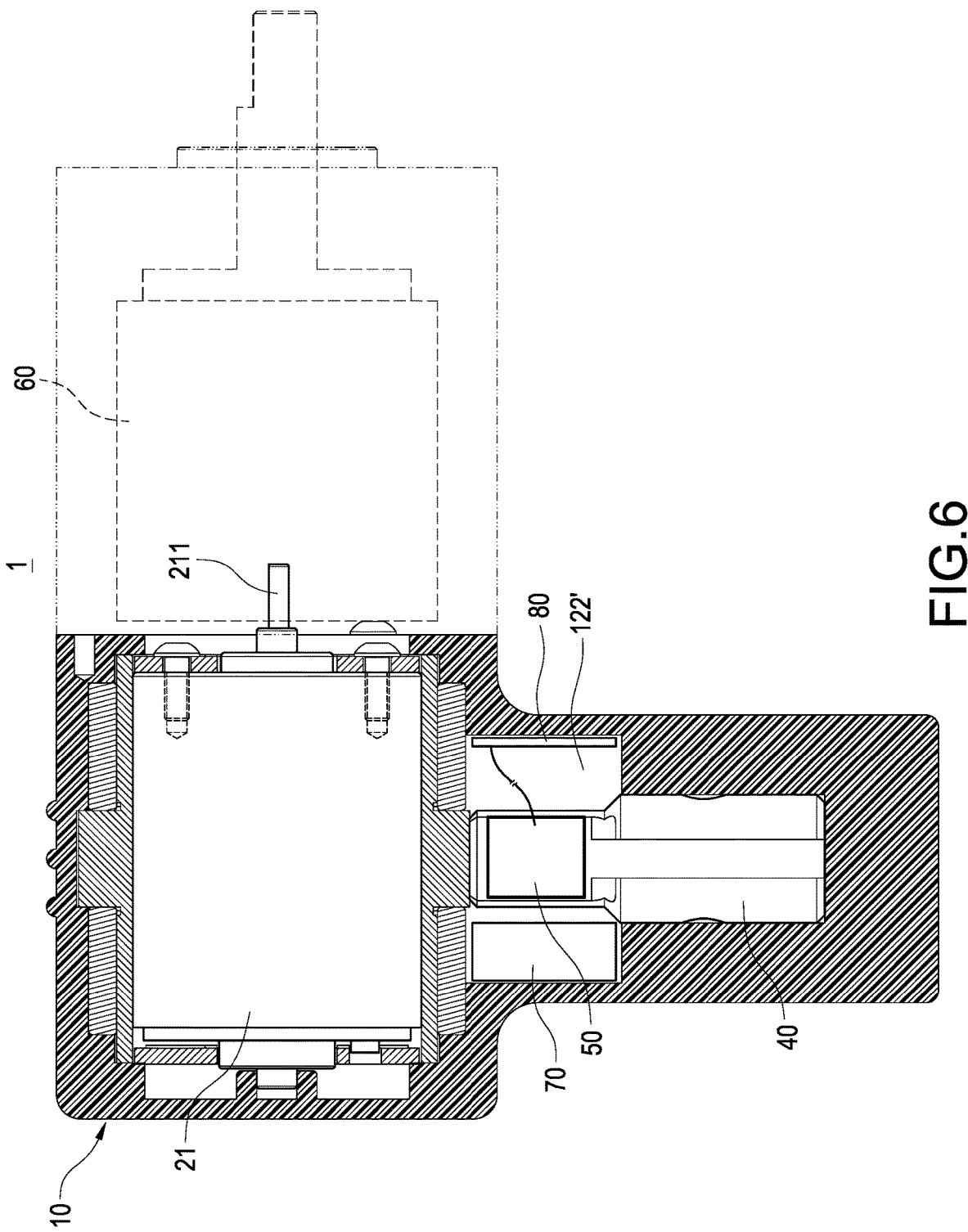
FIG. 6 is a schematic view illustrating operation of the power tool in this disclosure.

Please further refer to FIG. 6, which is a schematic view illustrating operation of the power tool in this disclosure. The power tool 1 of this disclosure further includes a gearbox 60. The gearbox 60 is connected to the driving shaft 211 of the power body 21 to provide the required output torque. Furthermore, the power tool 1 further includes a battery 70 and a control board 80. The battery 70 and the control board 80 are disposed in the installation gap 122', and the control board 80 is electrically connected with the power body 21 and the torque sensor 50.

Therefore, when the operation of the power body 21 is subject to an external resistance, a reverse force is generated to the power body 21. The power body 21 transmits the reverse force to the bushing 22, and the bushing 22 may rotate. Additionally, the rotation of the bushing 22 may drive the torque post 40 to be deformed. Accordingly, the torque sensor 50 disposed on the torque post 40 may receive the deformation amount to generate a signal.

Then, the torque sensor 50 transmits the signal to the control board 80 to immediately stop the power body 21. Furthermore, when the power tool 1 is actuated, the power body 21 may be affected by the vibration of an external tool under the power transmission and influence the torque value. Furthermore, the torque sensor 50 of this disclosure is disposed on the torque post 40 perpendicularly connected to one side of the power body 21. Since the torque post 40 is not a power transmission component, it may not be affected by the vibration of the power body 21. Therefore, the torque sensor 50 may perform the torque detection to provide an accurate torque value.

While this disclosure has been described by means of specific embodiments, numerous modifications and variations could be made thereto by those skilled in the art without departing from the scope and spirit of this disclosure set forth in the claims.

What is claimed is:

1. A power tool, comprising:
   a housing (10), comprising a main body (11) and a handle (12) perpendicularly connected to one side of the main body (11);
   a power device (20), disposed in the main body (11), and comprising a power body (21) and a bushing (22) adapted to sheathe the power body (21);
   a bearing set (30), arranged between the bushing (22) and the housing (10) to make the power body (21) rotate relative to the housing (10);
   a torque post (40), disposed in the handle (12) and abutting against the bushing (22), wherein the torque post (40) is arranged perpendicularly to the power body (21); and
   a torque sensor (50), disposed on the torque post (40).

2. The power tool according to claim 1, wherein an outer annular rib (220) is disposed on an outer surface of the bushing (22), and the bearing set (30) comprises a front bearing (31) and a rear bearing (32) arranged on two sides of the outer annular rib (220).

3. The power tool according to claim 1, wherein the bushing (22) comprises a bushing front side (221) and a bushing rear side (222) opposite to each other, a plurality of front pawls (2211) is disposed on an end edge of the bushing front side (221), and a plurality of rear pawls (2221) are disposed on an end edge of the bushing rear side (222).

4. The power tool according to claim 3, wherein the power device (20) further comprises a pair of motor fixing pieces (23), and the pair of motor fixing pieces (23) comprises a front fixing piece (231) and a rear fixing piece (232) disposed on two sides of the bushing (22) opposite to each other; a plurality of front tabs (2311) are arranged spacedly on a periphery of the front fixing piece (231); and a plurality of rear tabs (2321) are arranged spacedly on a periphery of the rear fixing piece (232).

5. The power tool according to claim 4, wherein the front fixing piece (231) is positioned on one end of the bushing front side (221) through the front tabs (2311) being engaged with the front pawls (2211), and the rear fixing piece (232) is positioned on one end of the bushing rear side (222) through the rear tabs (2321) being engaged with the rear pawls (2221).

6. The power tool according to claim 4, wherein the power device (20) further comprises a plurality of locking members (24); a plurality of first locking holes (2310) is defined on the front fixing piece (231); a plurality of second locking holes (210) are disposed on the power body (21) correspondingly; and the front fixing plate (231) is fixed on the power body (21) through the locking members (24) passing through the first locking holes (2310) and the second locking holes (210).

7. The power tool according to claim 2, wherein the torque post (40) comprises a base (41) and a platform (42) connected to the base (41), and the torque sensor (50) is disposed on one side of the platform (42).

8. The power tool according to claim 7, wherein the platform (42) comprises an abutting surface (421), and the platform (42) abuts against the outer annular rib (220) of the bushing (22) through the abutting surface (421).

9. The power tool according to claim 7, wherein the handle (12) comprises a positioning space (121) and an electricity space (122) communicating with each other; the base (41) is clamped in the positioning space (121); and the platform (42) is inserted in the electricity space (122) with an installation gap (122') being defined.

10. The power tool according to claim 9, further comprising a battery (70) and a control board (80), wherein the battery (70) and the control board (80) are disposed in the installation gap (122'), and the control board (80) is electrically connected with the power body (21) and the torque sensor (50).

\* \* \* \* \*